(12) United States Patent
Paxton et al.

(10) Patent No.: US 9,340,174 B1
(45) Date of Patent: May 17, 2016

(54) FLAT PANEL PLEATED AIRBAG CUSHIONS AND RELATED METHODS AND SYSTEMS

(71) Applicant: Autoliv ASP, Inc., Ogden, UT (US)

(72) Inventors: Donald Paxton, Romeo, MI (US); David Keyser, Orion, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/686,612

(22) Filed: Apr. 14, 2015

(51) Int. Cl.
*B60R 21/231* (2011.01)

(52) U.S. Cl.
CPC .................... *B60R 21/231* (2013.01)

(58) Field of Classification Search
CPC ...................................... B60R 21/231
See application file for complete search history.

(56) References Cited

U.S. PATENT DOCUMENTS

| | | | | |
|---|---|---|---|---|
| 4,630,312 A * | 12/1986 | Milstein | ............... | A44B 18/00 383/102 |
| 4,944,529 A * | 7/1990 | Backhaus | ............. | B60R 21/231 206/522 |
| 4,988,119 A * | 1/1991 | Hartmeyer | ............ | B60R 21/217 141/313 |
| 5,312,132 A * | 5/1994 | Pillet | ................. | B60R 21/235 139/1 R |
| 5,482,318 A | 1/1996 | Sollars, Jr. | | |
| 7,100,525 B1 * | 9/2006 | Price | .................... | D05B 11/005 112/132 |
| 7,207,594 B2 * | 4/2007 | Igawa | ................... | B60R 21/206 280/730.1 |
| 7,431,330 B2 * | 10/2008 | Korechika | ........... | B60R 21/231 280/730.1 |
| 8,764,055 B2 * | 7/2014 | Fischer | ................ | B60R 21/205 280/739 |
| 9,120,455 B2 * | 9/2015 | Sugimoto | ............. | B60R 21/231 |
| 2014/0097602 A1 * | 4/2014 | Nam | ................... | B60R 21/2338 280/743.1 |

FOREIGN PATENT DOCUMENTS

FR          2824029          10/2002

OTHER PUBLICATIONS

Concise Explanation of Relevance of FR 2824029.

* cited by examiner

*Primary Examiner* — Drew Brown
(74) *Attorney, Agent, or Firm* — Phillips Ryther & Winchester; Matthew D. Thayne

(57) ABSTRACT

Apparatus and methods, and systems relating to flat panel airbag cushions that may be particularly useful in connection with passenger-side airbag systems. Some embodiments may comprise a first panel and a second panel having a larger cross-sectional area than the first panel in an unfolded state. The second panel may comprise a first set of pleats and a second set of pleats configured such that, upon inflation of the airbag cushion, the first set of pleats and the second set of pleats unfold to define a three-dimensional airbag cushion. The second panel may be sewn or otherwise attached to the first panel about a periphery of the two panels.

21 Claims, 5 Drawing Sheets

FLAT PANEL PLEATED AIRBAG CUSHIONS AND RELATED METHODS AND SYSTEMS

SUMMARY

Certain cushions, such as driver airbag cushions in particular, are typically easier to sew because the fabric may be laid flat when sewing. This may allow for an automated, numerically controlled sewing machine to complete most of the stitching, thereby reducing the labor time and cost associated with manufacturing the cushion. Driver side airbags may be better suited for such flat panel coupling because of the manner in which such airbags react against a vehicle's steering wheel rim, which is essentially a flat plane in most cases. Thus, driver side airbags may, in many cases, comprise two flat panels sewn together around their perimeters.

By contrast, passenger side airbags react against a vehicle's windshield and instrument panel or dashboard, which typically have very complex surfaces. Because of these complex reaction surfaces, passenger airbags are often sewn into three-dimensional shapes, often by sewing together three or more panels of fabric. Typically, none of the three panels are flat, nor parallel with any of the panels (when the cushion is inflated or deflated).

The present inventors have therefore determined that it would be desirable to provide systems and methods that overcome one or more of the foregoing limitations and/or other limitations of the prior art. For example, the present inventors have determined that, by providing, in some embodiments, an airbag cushion comprising flat panels that may be sewn together as driver-side airbags often are, passenger side airbags may be provided that may take advantage of automated sewing technology or otherwise save time and money during manufacturing by simplifying the structure of the cushion, number of pieces, and/or the manufacturing methods used for assembly. Although preferred embodiments may be specifically designed for passenger-side airbags, it is contemplated that complicated airbag geometries may be provided by the inventive methods disclosed herein that may be useful in other airbags, including rear passenger airbags, airbag curtains and possibly even driver side airbags for certain implementations and applications.

In some embodiments, flat panels of fabric may be coupled together such that, upon inflation, they create a cushion shape that conforms to the contour/shape of one or more portions of a vehicle that will interface with the cushion during deployment, such as a vehicle's windshield and/or instrument panel in the case of a passenger side airbag cushion. This may be accomplished by creating a first flat panel that is intentionally formed larger than a second flat panel. The first panel may then be folded in particular areas and/or ways such that the second, larger panel at least substantially matches the perimeter of the first, smaller panel. Such pleats or folds may allow the panels to be sewn or otherwise coupled together as flat pieces and, in some embodiments, may allow for use of only two panels in manufacturing an airbag cushion.

In a more particular example of an airbag cushion according to some embodiments, the airbag cushion may comprise a first panel and a second panel having a larger cross-sectional area than the first panel in an unfolded state. The second panel may be sewn or otherwise attached to the first panel about a periphery of the first and/or second panels. The second panel may comprise a first set of pleats and a second set of pleats intersecting the first set of pleats such that, upon inflation of the airbag cushion, the first set of pleats and the second set of pleats unfold to define a three-dimensional airbag cushion.

In some embodiments, the first panel may be at least substantially lacking in pleats. In some such embodiments, the first panel may be entirely lacking in pleats.

In some embodiments, the first set of pleats may extend from a top portion of the airbag cushion to a lower portion of the airbag cushion. The second set of pleats, by contrast, may extend at least substantially in a horizontal direction between two opposing sides of the airbag cushion.

In some embodiments, the first set of pleats may extend in a fan-like pattern with a width of each of the first set of pleats expanding from a first end of the first set of pleats to a second end of the first set of pleats such that the airbag cushion, upon inflation, expands to a larger degree towards the second end.

Some embodiments may comprise additional pleat sets. For example, in some embodiments, a third set of pleats may be presented that may be positioned to extend from a first side of the airbag cushion opposite from a second side of the airbag cushion from which the first set of pleats extend. The third set of pleats, like the first set, may extend in a fan-like pattern with a width of each of the third set of pleats expanding from a first end of the third set of pleats to a second end of the third set of pleats such that the airbag cushion, upon inflation, expands to a larger degree towards the second end.

In some embodiments, the first set of pleats and the second set of pleats may be formed to avoid extending along an entire length of the airbag cushion such that a top portion of the airbag cushion is formed at least substantially free of pleats. In some such embodiments, a top portion of the cushion/pleated panel may be entirely free of pleats.

In some embodiments, the airbag cushion may comprise a passenger-side airbag cushion configured to inflate between a windshield and an instrument panel of a vehicle. In some such embodiments, the second set of pleats may be configured to allow the airbag cushion to bend, such as to bend around a vehicle instrument panel of a vehicle, upon inflation of the airbag cushion.

The second set of pleats may comprise horizontal pleats extending from a first side of the second panel to a second side of the second panel opposite from the first side. Thus, the airbag cushion may be configured to be positioned within a passenger-side airbag housing of a vehicle such that, upon deployment of the airbag cushion, the second set of pleats unfolds to allow the airbag cushion to bend around the vehicle instrument panel and towards a passenger of the vehicle.

Some embodiments may further comprise one or more tethers configured to constrain the size, shape, and/or deployment characteristics during inflation. For example, some embodiments may comprise a first tether coupled to a first side of at least one of the first panel and the second panel and a second tether coupled to a second side of at least one of the first panel and the second panel opposite the first side. In some embodiments, the first tether may also be coupled to the second tether. In some embodiments, the attachment means, such as a stitch line, used to couple one of the panels of the airbag cushion to the other panel, may also be used to couple one or both of the tethers to the cushion.

In a more particular example of a flat panel, passenger-side airbag cushion according to other embodiments, the cushion may comprise a first panel and a second panel having a larger cross-sectional area than the first panel in an unfolded state. The second panel may be sewn or otherwise attached to the first panel about a periphery of the first panel. The second panel may comprise an unfolded region positioned adjacent to an upper edge of the second panel. The second panel may further comprise a first set of vertical pleats extending from a border of the unfolded region towards a lower region of the second panel, wherein the first set of pleats extends in a fan-like pattern with a width of each of the first set of pleats expanding from a first end of the first set of pleats to a second end of the first set of pleats such that the airbag cushion, upon inflation, expands to a larger degree towards the lower region. The second panel may further comprise a second set of horizontal pleats intersecting the first set of pleats from a first side of the second panel to a second side of second panel opposite from the first side such that, upon inflation of the airbag cushion, the first set of pleats and the second set of pleats unfold to define a three-dimensional airbag cushion.

Some embodiments may further comprise a third set of vertical pleats extending from a border of the unfolded region towards a lower region of the second panel. The third set of pleats may also extend in a fan-like pattern with a width of each of the third set of pleats expanding from a first end of the third set of pleats to a second end of the third set of pleats. This may further facilitate the airbag cushion, upon inflation, expanding to a larger degree towards the lower region.

In some embodiments, the first set of vertical pleats may extend from the first side of the second panel towards a center of the second panel. Similarly, in some embodiments, the third set of vertical pleats may extend from the second side of the second panel towards the center of the second panel.

In an example of a method for manufacturing an airbag cushion, the method may comprise obtaining a first panel comprising a first profile defined by a periphery of the first panel and obtaining a second panel comprising a second profile defined by a periphery of the second panel, wherein the second panel has a larger profile than the first panel. A first set of pleats may be formed in the second panel such that the second panel has a reduced profile defined by a periphery of the second panel after formation of the first set of pleats. The first set of pleats may further be formed such that a lower portion of the second panel expands to a greater degree than an upper portion of the second panel upon unfolding of the first set of pleats during deployment of the airbag cushion. After the step of forming a first set of pleats in the second panel, the first panel may be attached (in some embodiments, directly attached) to the second panel about respective peripheries of the first and second panels.

In some implementations, the reduced profile may be at least substantially identical to the first profile such that the periphery of the second panel after forming the first set of pleats in the second panel is at least substantially identical in size and shape to the periphery of the first panel.

In some implementations, the step of sewing the first panel to the second panel may further comprise sewing or otherwise coupling a first tether to a first side of at least one of the first panel and the second panel and sewing or otherwise coupling a second tether to a second side of at least one of the first panel and the second panel opposite the first side. In some implementations, the first tether may be sewn or otherwise coupled to the second tether.

Some implementations may further comprise forming additional pleat sets. For example, in some implementations, a second set of pleats may be formed in the second panel. The second set of pleats may intersect the first set of pleats. Similarly, some implementations may comprise forming a third set of pleats in the second panel. The third set of pleats may be positioned on an opposite side of the second panel relative to the first set of pleats, and the second set of pleats may intersect both the first set of pleats and the third set of pleats.

In some implementations, the first and/or third sets of pleats may extend in a fan-like pattern with a width of each of the first set of pleats expanding from a first end of the first set of pleats to a second end of the first set of pleats, and similarly with a width of each of the third set of pleats expanding from a first end of the third set of pleats to a second end of the third set of pleats.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to flat panel airbag cushions. In preferred embodiments and implementations, such airbag cushions may comprise one or more sets of pleats configured to unfold during deployment to allow for, in some embodiments, two flat panels to expand into desired three-dimensional shapes that may be dictated by the positioning, size, shape, and/or interactions of the various pleats.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Figure 1A:
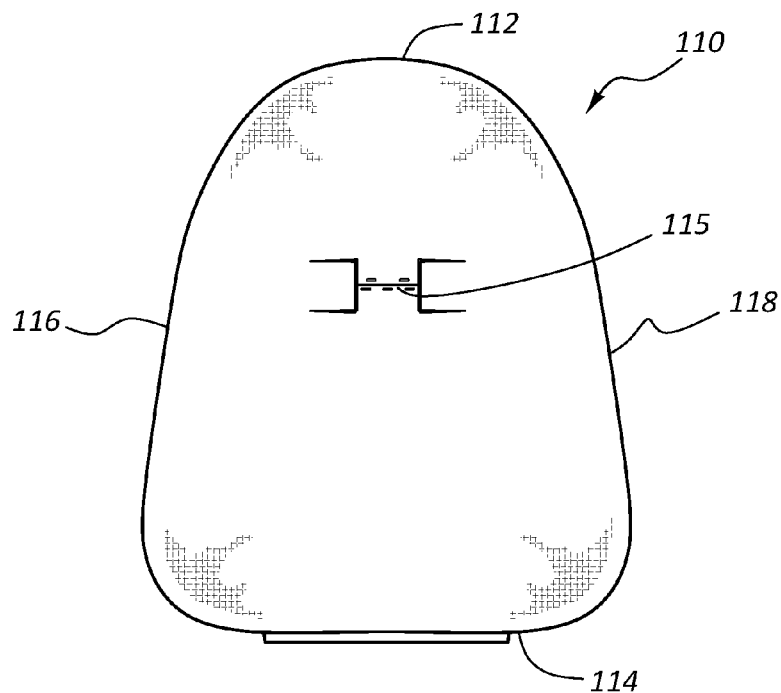
FIG. 1A is a plan view of a first flat panel of an airbag cushion according to one embodiment.
Figure 1B:
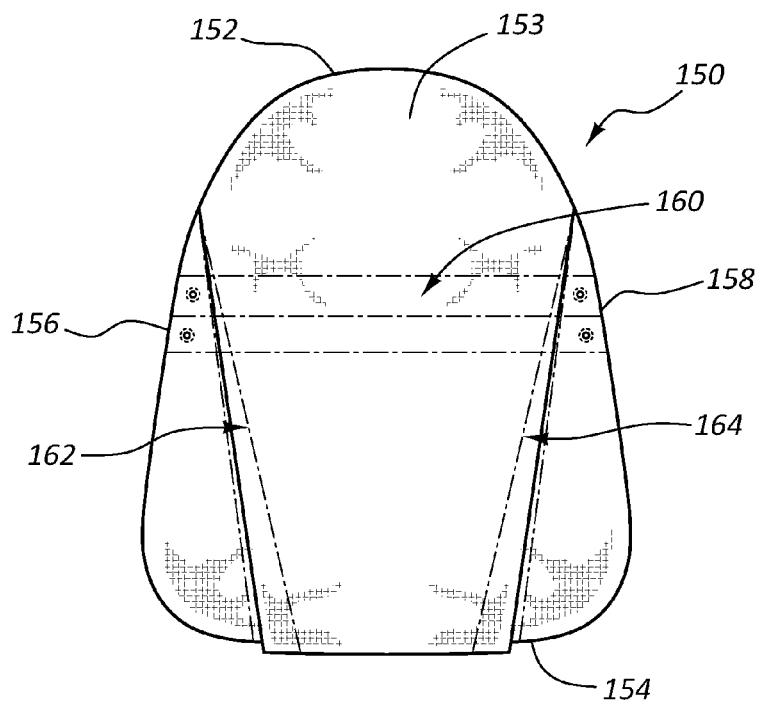
FIG. 1B is a plan view of a second, pleated flat panel of an airbag cushion according to one embodiment.

FIGS. 1A and 1B depict two flat panels, namely panel 110 and panel 150, that may be coupled together to form an airbag cushion. Panel 110 comprises an upper edge 112, a lower edge 114 and two opposing side edges 116 and 118. An inflator opening 115 may be formed in either panel 110 or panel 150. In the depicted embodiment panel 110 comprises inflator opening 115, since preferably panel 110 is positioned distally relative to a passenger of a vehicle or another occupant relative to panel 150. However, it may be possible to form an inflator opening in panel 150 in alternative embodiments.

Similarly, panel 150 comprises an upper edge 152, a lower edge 154 and two opposing side edges 156 and 158. Panel 150 further comprises three sets of pleats. More particularly, panel 150 comprises a first set of horizontal pleats 160 extending between opposing side edges 156 and 158. Pleats 160 may be at least substantially parallel to one another such that a length of panel 150 (between upper edge 152 and lower edge 154) expands the same, or at least substantially the same, amount along the entire width of panel 150 (between opposing side edges 156 and 158). In some embodiments, pleats 160 may be positioned to extend across a relatively central point of panel 150 between upper edge 152 and lower edge 154.

In addition, in some embodiments, pleats 160 may be numbered, sized, and positioned such that the length panel 150 expands by between about 30 and about 45 percent between its folded and its unfolded configurations. In some embodiments, one large horizontal pleat 160 may be present. In other embodiments, two smaller horizontal pleats 160. In some embodiments, horizontal pleats 160 may be between about 60 and about 100 mm in depth. Pleats 160 may further be configured so as to unfold in such a way that the airbag cushion formed by panel 150 can bend around a vehicle instrument panel or dash and towards a passenger of a vehicle incorporating the airbag cushion.

A set of vertical pleats 162 may extend from side 156 and may extend in a fan-like pattern with a width of each of pleats 162 expanding from a first end of the pleats 162 to a second end of pleats 162 such that the airbag cushion formed by panels 110 and 150, upon inflation, expands to a greater degree towards the lower end 154 of the cushion. In some embodiments, each of the pleats 162, or at least a subset of pleats 162, may begin from a side edge (side edge 156 in the depicted embodiment) of panel 150. In some embodiments, each of the pleats 162, or at least a subset of pleats 162, may begin from the same, or at least substantially the same, point on panel 150 and gradually expand in width towards the opposite end of pleats 162. In some embodiments, pleats 162, or at least a subset of pleats 162, may terminate at a lower edge 154 of panel 150. In addition, as illustrated in FIG. 1B, in some embodiments, pleats 162 may extend towards a center of panel 150 between opposing sides 156 and 158.

A second set of vertical pleats 164 extends from side 158 and extends in a fan-like pattern with a width of each of pleats 164 expanding from a first end of the pleats 164 to a second end of pleats 164. Along with pleats 162, this configuration allows the airbag cushion formed by panels 110 and 150, upon inflation, to expand to an even greater degree towards the lower end 154 of the cushion relative to the upper end 152 of the cushion. In some embodiments, each of the pleats 164, or at least a subset of pleats 164, may begin from a side edge (side edge 158 in the depicted embodiment) of panel 150. In some embodiments, each of the pleats 164, or at least a subset of pleats 164, may begin from the same, or at least substantially the same, point on panel 150 and gradually expand in width towards the opposite end of pleats 164. In some embodiments, pleats 164, or at least a subset of pleats 164, may terminate at a lower edge 154 of panel 150. In addition, as illustrated in FIG. 1B, in some embodiments, pleats 164 may extend towards a center of panel 150 between opposing sides 156 and 158.

In some embodiments, a single vertical pleat 162 may be present on one side of panel 150 and another single vertical pleat 164 may be present on the opposite side of panel 150. In some embodiments, each of the vertical pleats 162/164 may comprise a width of between about 60 and about 100 mm at the bottom or lower end of the vertical pleats 162/164.

In certain preferred embodiments, any or all of the various pleats may only be formed on the panel (in the depicted embodiment, panel 150), that is configured to deploy facing the occupant. However, other embodiments are contemplated in which the pleats may instead be formed on the opposite panel that may, in the case of a passenger-side airbag, be configured to deploy adjacent to an instrument panel, dash, and/or windshield.

As also shown in FIG. 1B horizontal pleats 160 intersect both vertical pleats 162 and 164, which may provide for a desired deployment configuration, particularly for a passenger-side airbag. In some embodiments, horizontal pleats, such as pleats 160, may allow the inflated airbag cushion to change directions or bend around certain items within a vehicle, such as an instrument panel and/or windshield. Vertical pleats may be provided to give the deployed airbag a desired amount of depth. In some embodiments, the placement, positioning, and/or configuration of the various pleats may allow the airbag cushion to expand more in certain regions of the cushion or otherwise deploy in a desired manner.

In some embodiments, panel 150 may have a larger cross-sectional area than panel 110 in an unfolded state. However, panel 150 may be sewn or otherwise coupled to panel 110 after a plurality of pleats, such as pleats 160, 162, and 164, have been formed in panel 150 such that panel 150 has a reduced cross-sectional area. In some embodiments, the reduced cross-sectional area or profile of the folded panel (panel 150) may be identical, or at least substantially identical, to that of the unfolded panel (panel 110). In some embodiments, after creating all the desired pleats, panel 150 may be coupled to panel 110 by sewing or otherwise coupling the two panels together about their respective peripheries.

It can also be see in FIG. 1B that folded panel 150 may further comprise an unfolded region 153 positioned adjacent to upper edge 152. This region may be desirable for certain applications since it may further facilitate desired deployment around, for example, a vehicle windshield. In some embodiments, an airbag cushion may be formed using only panels 110 and 150.

Figure 2:
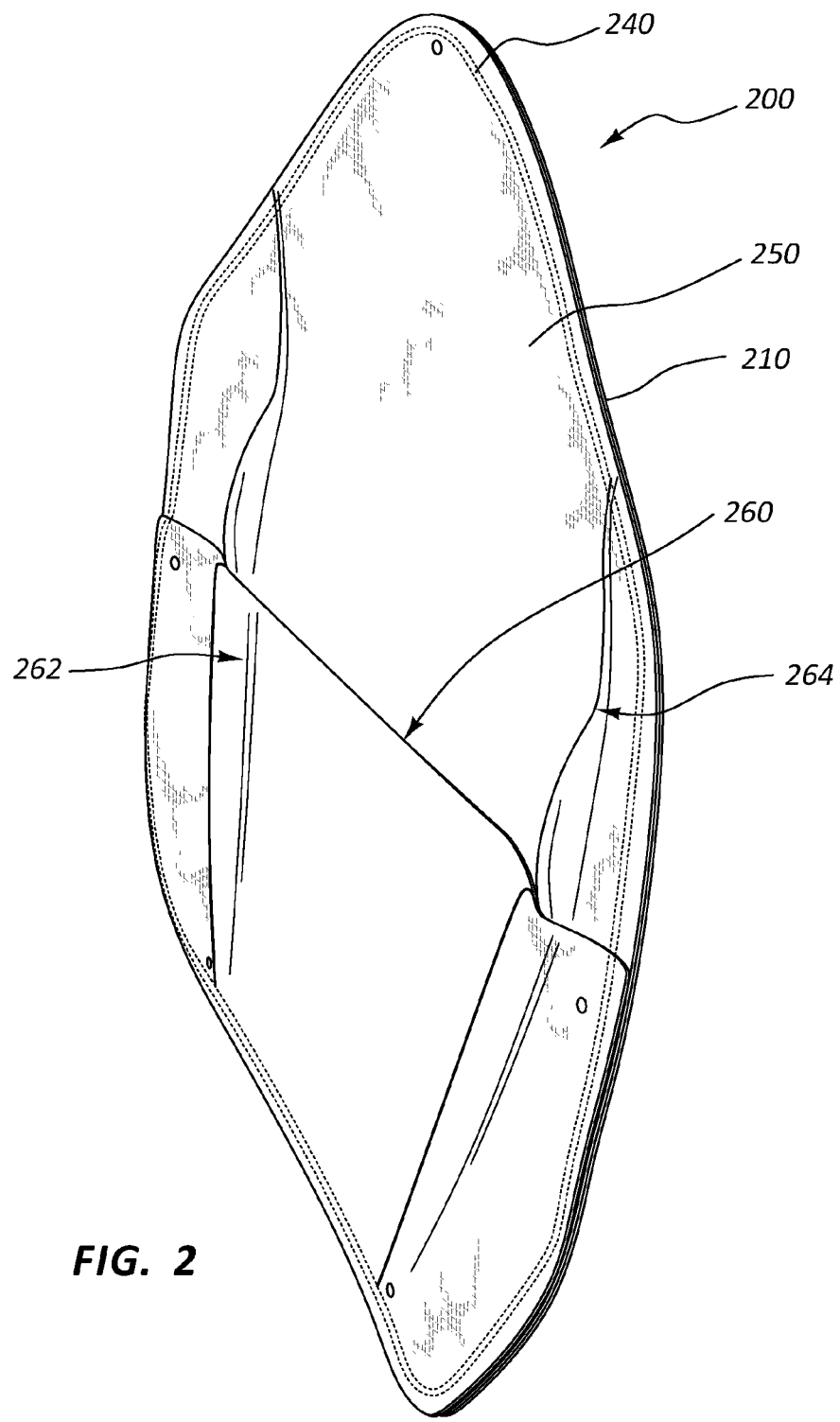
FIG. 2 is a perspective view of an airbag cushion comprising a first flat panel sewn to a second, pleated flat panel about the respective peripheries of the two panels according to another embodiment.

FIG. 2 is a perspective view of an airbag cushion 200 comprising a first flat panel 210 sewn to a second, pleated flat panel 250 about the respective peripheries of the two panels according to another embodiment. Airbag cushion 200 comprises three sets of pleats, namely, a first horizontal set of pleats 260, and two sets of vertical pleats 262 and 264. Horizontal pleat set 260 intersects vertical pleat sets 262 and 264. Although in preferred embodiments, a plurality of pleats may be formed in each pleat set, it is contemplated that a single pleat may suffice for certain pleat sets. For example, horizontal pleat set 260 may comprise a single pleat in some embodiments, if sufficiently wide. In addition, although providing pleats that expand in a fan-like pattern, as described above in connection with FIG. 1B, may be preferred for certain applications, in some embodiments, one or both of vertical pleat sets 262 and 264 may instead comprise parallel, or at least substantially parallel, pleats, similar to pleats 160 in FIG. 1B.

FIG. 2 further depicts a sew line 240 that extends about the respective peripheries of the two panels 210 and 250. In certain preferred embodiments, airbag cushion 200 may be formed using only these two flat panels, which may allow for use of less expensive and/or time-consuming manufacturing processes that are often used, particularly for passenger-side airbag cushions. In some embodiments, sew line 240 may comprise another suitable means for coupling panel 210 to panel 250, such as an adhesive, staples, or the like. In some embodiments, a robotic sewing operation may be used to couple a first flat panel with a second, pleated flat panel, as described herein. In some embodiments, the pleated panel may be aligned with pegs, bars, arms, plates, or other aligning members used to maintain the two panels in a flat configuration and/or maintain the various pleats during the operation.

Figure 3:
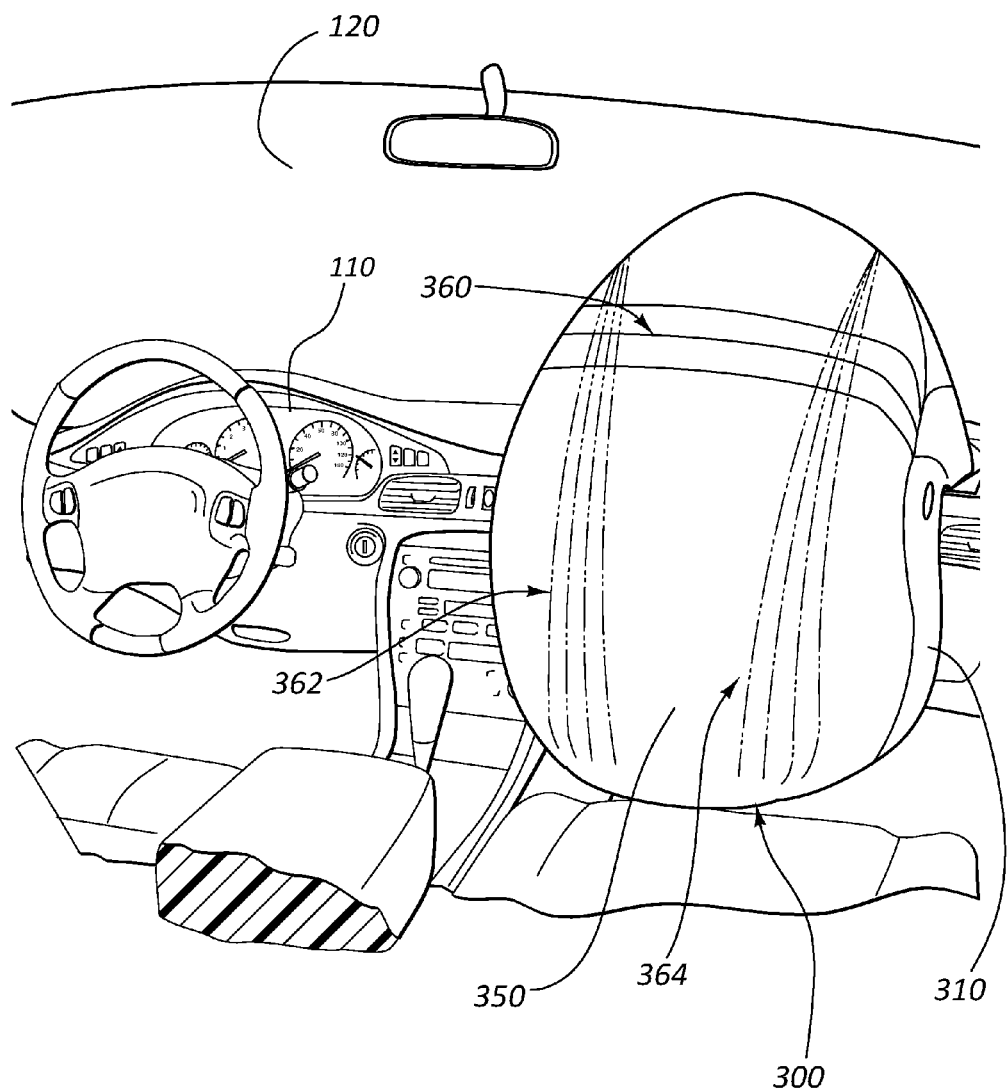
FIG. 3 depicts a passenger-side airbag cushion according to an embodiment of the invention following deployment.

FIG. 3 depicts a passenger-side airbag cushion 300 according to another embodiment of the invention, shown following deployment. As depicted in this figure, airbag cushion 300 comprises a rear panel 310 and a front panel 350. Front panel 350, prior to deployment, comprises a series of pleats, as described above, which unfolded during deployment to result in the three-dimensional shape depicted in the figure. Lines corresponding to horizontal pleats 360, which have been unfolded in the state depicted in FIG. 3, have been included to show the preferred pattern of these pleats. Pleats 360 may allow airbag cushion 300 to bend around one or more objects within a passenger side of a vehicle, such as instrument panel 110 and/or windshield 120. In some embodiments, pleats 360 may be positioned with respect to a corresponding airbag module and vehicle such that a first one of pleats 360 at least generally corresponds with a point of transition away from a vehicle windshield, such as windshield 120. Thus, an unfolded section may be formed above (or distal from the perspective of a passenger) the first horizontal pleat 360 near a top portion of the airbag cushion 300.

Lines corresponding to vertical pleat sets 362 and 364, which have been unfolded in the state depicted in FIG. 3, have been included to show the preferred pattern of these pleats. As referenced above, vertical pleats 362 and/or 364 may be formed into a fan-like pattern with a width of each of the vertical pleats expanding from a first end of the pleats to a second end of the pleats such that the airbag cushion 300 expands to a larger degree towards the second or lower end during inflation.

Figure 4:
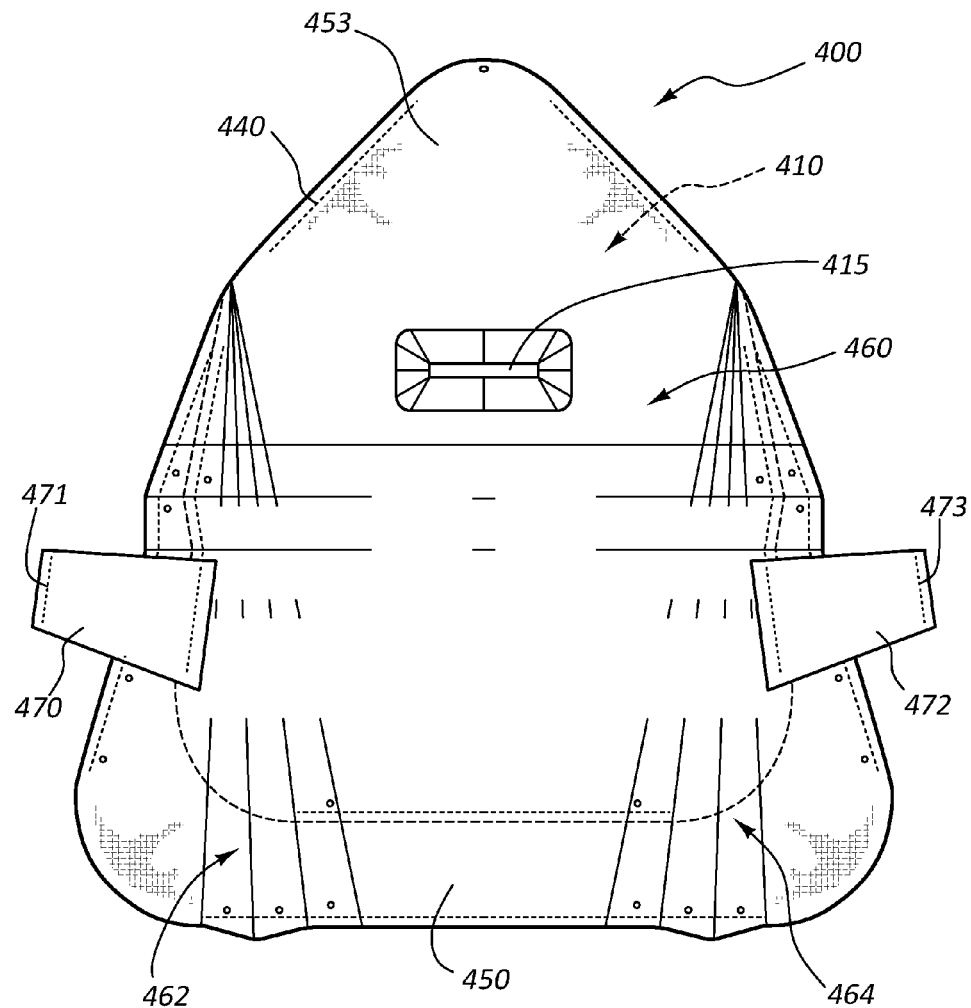
FIG. 4 is a plan view of two flat panels according to another embodiment with the smaller panel shown in phantom prior to formation of the pleats.

FIG. 4 is a plan view of two flat panels, namely, panels 410 and 450, according to another embodiment of an airbag cushion 400. The smaller, unfolded panel 410 is shown in phantom below the larger, unfolded panel 450 to illustrate the difference in size of the two panels prior to forming pleats in panel 450. Panel 410 may comprise an inflator opening 415.

Panel 450 may comprise a series of pleat sets. For example, panel 450 comprises a first horizontal pleat set 460 (note that the lines in pleat set 460 indicate where the folds will be made but panel 450 is illustrated in an unfolded state in FIG. 4) and first and second vertical pleat sets 462 and 464 (these lines also indicate a folding pattern but actual folds have not yet been made in the state depicted in FIG. 4). Horizontal pleat set 460 comprises three pleats extending between opposing sides of panel 450. Other numbers of pleats may be used as desired in accordance with the application. Preferably, pleats 460 extend at least substantially parallel to one another across panel 460.

First and second vertical pleat sets 462 and 464 each comprise a plurality of pleats extending from opposing sides of panel 450 towards a center of panel 450 (from a horizontal perspective). In addition, each of the pleats in pleat sets 462 and 464 expand in a fan-like pattern towards the bottom of panel 450. An unfolded region 453 is positioned in a top portion of panel 450. Thus, this portion may correspond with a similar portion of panel 410, both in an unfolded and a folded state.

The extent to which the profile of panel 450 changes between its unfolded and folded states can be seen by comparing the stitch lines 440 of the two panels. Thus, near the bottom of the respective panels 410 and 450, it can be seen that the distance between the two stitch lines is constant, due to the parallel placement of horizontal pleats 460. However, the distance between the side edges of the respective panels 410 and 450 increases from the point at which they meet (the border of unfolded region 453) to the bottoms of the respective panels. This is due to the fan-like configurations of the two vertical pleat sets 462 and 464 and the way in which they extend diagonally towards the center of the panel 450.

This configuration may allow airbag cushion 400 to experience relatively little expansion near the top of the cushion, which may be positioned to expand adjacent to a windshield and/or instrument panel rather than an occupant during deployment, and increase the expansion towards the bottom of the cushion, which is more likely to be useful in cushioning an occupant, such as a passenger, during an impact. In some embodiments, airbag cushion 400 may be specifically configured such that the degree of expansion allowed gradually increases from a particular point of the cushion towards the bottom.

Panel 450 may further comprise one or more tethers 470/ 472. Tethers 470 and 472 may further constrain deployment of the airbag cushion 400 in a desired manner and/or providing a desired shape to airbag cushion 400 upon deployment. For example, tethers 470 and 472 may be used to direct deployment towards a vehicle occupant and/or prevent airbag cushion 400 from extending in undesired directions or otherwise deploying in an undesirable manner. In the depicted embodiment, tethers 470 and 472 may be sewn directly to one or both of panels 410 and 450. In some embodiments, tethers 470 and 472 may be sewn or otherwise coupled to panel 450 in the same sewing/coupling operation used to couple panel 410 to panel 450. In some embodiments, tethers 470 and 472 may be coupled together, as indicated in stitch lines 471 and 473, respectively, prior to putting airbag cushion 400 in an airbag housing or module. The respective or collective lengths of tether 470 and 472, along with their respective positions, may then be selected in order to facilitate a desired deployment shape/direction/etc.

In some embodiments, the presence of tethers 470 and 472, or, alternatively, a corresponding single cross-tether extending between opposite sides of the cushion, may function in connection with the various pleats to provide desired deployment characteristics. More particularly, the use of one or more such tethers may restrain the horizontal expansion of the cushion and instead direct this horizontal expansion out towards the vehicle occupant, thereby enhancing the cushion depth and providing a more three-dimensional shape that may be preferred for certain applications.

Figure 5:
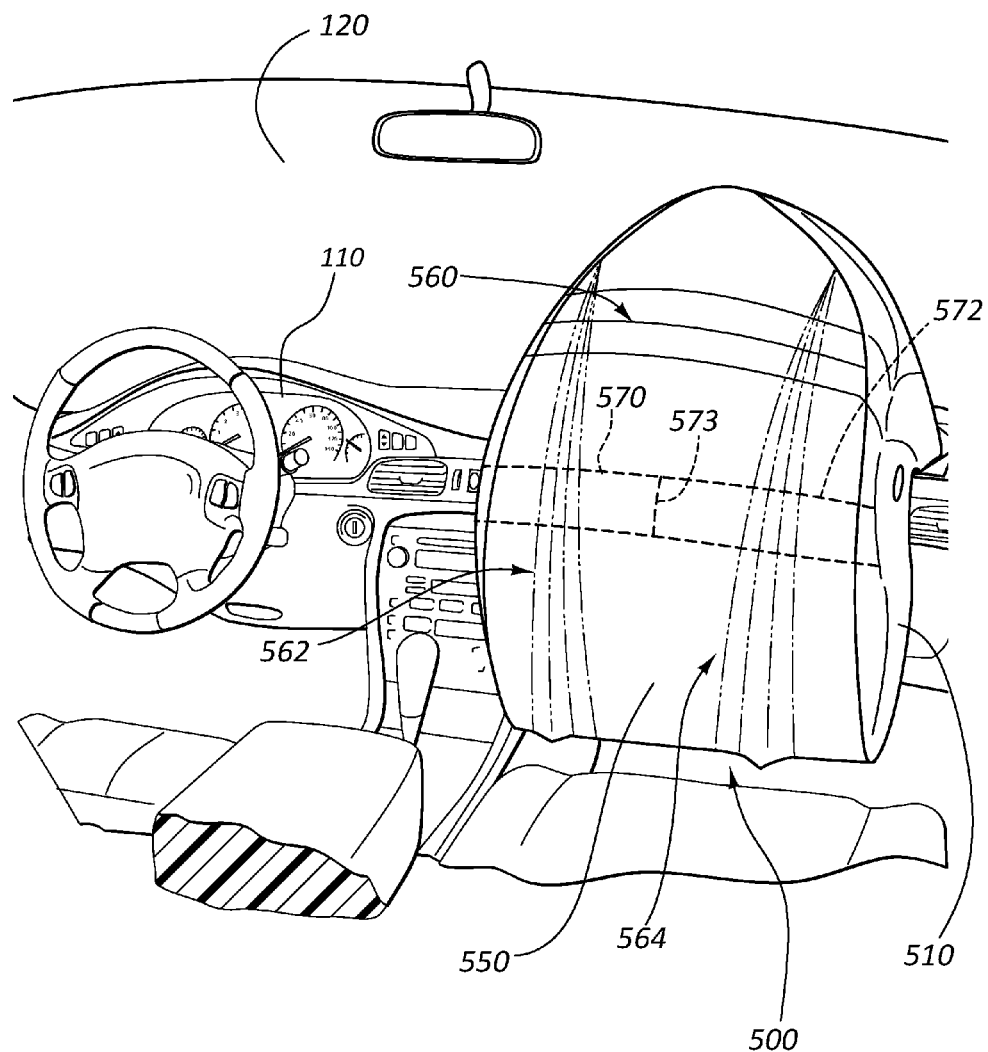
FIG. 5 depicts a passenger-side airbag cushion according to another embodiment of the invention following deployment.

This effect can be seen in FIG. 5, which depicts a passenger-side airbag cushion 500 comprising a cross-car tether according to another embodiment following deployment. As depicted in this figure, airbag cushion 500 comprises a rear panel 510 and a front panel 550. Front panel 550, prior to deployment, may comprise a series of pleats, as described above, which unfolded during deployment to result in the three-dimensional shape depicted in the figure. Lines corresponding to horizontal pleats 560, which have been unfolded in the state depicted in FIG. 5, have been included to show the preferred pattern of these pleats. Pleats 560 may allow airbag cushion 500 to bend around one or more objects within a passenger side of a vehicle, such as instrument panel 110 and/or windshield 120, to enhance the expansion towards an occupant. In some embodiments, pleats 560 may be positioned with respect to a corresponding airbag module and vehicle such that a first one of pleats 560 at least generally corresponds with a point of transition away from a vehicle windshield, such as windshield 120. Thus, an unfolded section may be formed above (or distal from the perspective of a passenger) the first horizontal pleat 560 near a top portion of the airbag cushion 500.

Lines corresponding to vertical pleat sets 562 and 564, which have been unfolded in the state depicted in FIG. 5, have been included to show the preferred pattern of these pleats. As referenced above, vertical pleats 562 and/or 564 may be formed into a fan-like pattern with a width of each of the vertical pleats expanding from a first end of the pleats to a second end of the pleats such that the airbag cushion 500 expands to a larger degree towards the second or lower end during inflation.

Airbag cushion 500 further comprises a tether extending horizontally across preferably a centrally located point (from a vertical perspective) of the cushion. In the depicted embodiment, this tether is made up of a first tether portion 570 and a second tether portion 572, both of which are shown in phantom (because preferably they extend across the inside of the cushion 500), and both of which may be coupled together at a sew or other attachment line 573. As described above in connection with FIG. 4, these tethers may be coupled to opposing peripheral edges of front panel 550. In some embodiments, the sew line or other attachment means used to couple front panel 550 to rear panel 510 may also be used to couple one or both of tether portions 570 and 572. In some embodiments, a single tether may extend all of the way across airbag cushion 500 rather than using two separate tether portions that are coupled together.

As illustrated in FIG. 5, the presence of the tether made up of tether portions 570 and 572 may restrict the lateral expansion of airbag cushion 500 and instead allow airbag cushion 500 to expand to a greater degree in a direction towards an occupant of the vehicle. The length and/or points of attachment of the tether/tether portions may be adjusted as desired to enhance expansion of the airbag cushion in a desired direction, or otherwise adjust desired deployment characteristics.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag cushion, comprising:
 a first panel; and
 a second panel having a larger cross-sectional area than the first panel in an unfolded state, wherein the second panel is attached to the first panel about a periphery of the first panel, and wherein the second panel comprises:
  a first set of pleats; and
  a second set of pleats intersecting the first set of pleats such that, upon inflation of the airbag cushion, the first set of pleats and the second set of pleats unfold to define a three-dimensional airbag cushion.

2. The airbag cushion of claim 1, wherein the first panel is at least substantially lacking in pleats.

3. The airbag cushion of claim 1, wherein the first set of pleats extend from a top portion of the airbag cushion to a lower portion of the airbag cushion.

4. The airbag cushion of claim 3, wherein the second set of pleats extend at least substantially in a horizontal direction between two opposing sides of the airbag cushion.

5. The airbag cushion of claim 1, wherein the first set of pleats extends in a fan-like pattern with a width of each of the first set of pleats expanding from a first end of the first set of pleats to a second end of the first set of pleats such that the airbag cushion, upon inflation, expands to a larger degree towards the second end.

6. The airbag cushion of claim 5, further comprising a third set of pleats, wherein the third set of pleats is positioned to extend from a first side of the airbag cushion, wherein the first set of pleats is positioned to extend from a second side of the airbag cushion opposite from the first side, wherein the third set of pleats extends in a fan-like pattern with a width of each of the third set of pleats expanding from a first end of the third set of pleats to a second end of the third set of pleats such that the airbag cushion, upon inflation, expands to a larger degree towards the second end.

7. The airbag cushion of claim 1, wherein the first set of pleats and the second set of pleats are formed to avoid extending along an entire length of the airbag cushion such that a top portion of the airbag cushion is formed at least substantially free of pleats.

8. The airbag cushion of claim 1, wherein the airbag cushion comprises a passenger-side airbag cushion configured to inflate between a windshield and an instrument panel of a vehicle.

9. The airbag cushion of claim 8, wherein the second set of pleats are configured to allow the airbag cushion to bend around a vehicle instrument panel of a vehicle upon inflation of the airbag cushion.

10. The airbag cushion of claim 9, wherein the second set of pleats comprise horizontal pleats extending from a first side of the second panel to a second side of the second panel opposite from the first side, and wherein the airbag cushion is configured to be positioned within a passenger-side airbag housing of a vehicle such that, upon deployment of the airbag cushion, the second set of pleats unfolds to allow the airbag cushion to bend around the vehicle instrument panel and towards a passenger of the vehicle.

11. A flat panel, passenger-side airbag cushion, comprising:
a first panel; and
a second panel having a larger cross-sectional area than the first panel in an unfolded state, wherein the second panel is attached to the first panel about a periphery of the first panel, and wherein the second panel comprises:
an unfolded region positioned adjacent to an upper edge of the second panel;
a first set of vertical pleats extending from a border of the unfolded region towards a lower region of the second panel, wherein the first set of pleats extends in a fan-like pattern with a width of each of the first set of pleats expanding from a first end of the first set of pleats to a second end of the first set of pleats such that the airbag cushion, upon inflation, expands to a larger degree towards the lower region;
a second set of horizontal pleats intersecting the first set of pleats from a first side of the second panel to a second side of second panel opposite from the first side such that, upon inflation of the airbag cushion, the first set of pleats and the second set of pleats unfold to define a three-dimensional airbag cushion.

12. The airbag cushion of claim 11, further comprising a third set of vertical pleats extending from a border of the unfolded region towards a lower region of the second panel, wherein the third set of pleats extends in a fan-like pattern with a width of each of the third set of pleats expanding from a first end of the third set of pleats to a second end of the third set of pleats such that the airbag cushion, upon inflation, expands to a larger degree towards the lower region.

13. The airbag cushion of claim 12, wherein the first set of vertical pleats extends from the first side of the second panel towards a center of the second panel, and wherein the third set of vertical pleats extends from the second side of the second panel towards the center of the second panel.

14. A method for manufacturing an airbag cushion, the method comprising the steps of:
obtaining a first panel comprising a first profile defined by a periphery of the first panel;
obtaining a second panel comprising a second profile defined by a periphery of the second panel, wherein the second panel has a larger profile than the first panel;
forming a first set of pleats in the second panel such that the second panel has a reduced profile defined by a periphery of the second panel after formation of the first set of pleats, wherein the first set of pleats is formed such that a lower portion of the second panel expands to a greater degree than an upper portion of the second panel upon unfolding of the first set of pleats during deployment of the airbag cushion; and
after the step of forming a first set of pleats in the second panel, attaching the first panel directly to the second panel about respective peripheries of the first and second panels.

15. The method of claim 14, wherein the reduced profile is at least substantially identical to the first profile such that the periphery of the second panel after forming the first set of pleats in the second panel is at least substantially identical in size and shape to the periphery of the first panel.

16. The method of claim 14, wherein the step of attaching the first panel directly to the second panel comprises sewing the first panel to the second panel.

17. The method of claim 16, wherein the step of sewing the first panel to the second panel further comprises sewing a first tether to a first side of at least one of the first panel and the second panel and sewing a second tether to a second side of at least one of the first panel and the second panel opposite the first side, and wherein the method further comprises coupling the first tether to the second tether.

18. The method of claim 14, further comprising forming a second set of pleats in the second panel, wherein the second set of pleats intersects the first set of pleats.

19. The method of claim 18, further comprising forming a third set of pleats in the second panel, wherein the third set of pleats is positioned on an opposite side of the second panel relative to the first set of pleats, and wherein the second set of pleats intersects both the first set of pleats and the third set of pleats.

20. The method of claim 19, wherein the first set of pleats extends in a fan-like pattern with a width of each of the first set of pleats expanding from a first end of the first set of pleats to a second end of the first set of pleats, and wherein the third set of pleats extends in a fan-like pattern with a width of each of the third set of pleats expanding from a first end of the third set of pleats to a second end of the third set of pleats.

21. The method of claim 14, wherein the first set of pleats extends in a fan-like pattern with a width of each of the first set of pleats expanding from a first end of the first set of pleats to a second end of the first set of pleats.

* * * * *